United States Patent
Maev et al.

(10) Patent No.: US 10,300,445 B2
(45) Date of Patent: May 28, 2019

(54) HOPPER WITH MICROREACTOR AND CARTRIDGE FOR LOW PRESSURE COLD SPRAYING

(71) Applicant: Tessonics, Inc., Windsor (CA)

(72) Inventors: Roman Gr. Maev, Windsor (CA); Volf Leshchynsky, Windsor (CA); Emil Strumban, West Bloomfield, MI (US); Dmitry Dzhurinskiy, Windsor (CA); Zygmunt Baran, Windsor (CA)

(73) Assignee: Tessonics, Inc. (CA)

( * ) Notice: Subject to any disclaimer, the term of this patent is extended or adjusted under 35 U.S.C. 154(b) by 116 days.

(21) Appl. No.: 15/698,108

(22) Filed: Sep. 7, 2017

(65) Prior Publication Data

US 2018/0065100 A1   Mar. 8, 2018

Related U.S. Application Data

(60) Provisional application No. 62/384,353, filed on Sep. 7, 2016.

(51) Int. Cl.

| | |
|---|---|
| *B01J 8/10* | (2006.01) |
| *B05B 7/14* | (2006.01) |
| *B65G 53/36* | (2006.01) |
| *B65G 53/46* | (2006.01) |
| *B01J 8/00* | (2006.01) |
| *B05B 7/16* | (2006.01) |

(52) U.S. Cl.
CPC .............. *B01J 8/002* (2013.01); *B01J 8/10* (2013.01); *B05B 7/144* (2013.01); *B05B 7/1445* (2013.01); *B05B 7/1463* (2013.01); *B65G 53/36* (2013.01); *B65G 53/4616* (2013.01); *B05B 7/166* (2013.01)

(58) Field of Classification Search
None
See application file for complete search history.

(56) References Cited

U.S. PATENT DOCUMENTS

| | | | |
|---|---|---|---|
| 4,808,042 A | | 2/1989 | Muehlberger et al. |
| 5,302,414 A | * | 4/1994 | Alkhimov ............... B05B 7/144 427/191 |

(Continued)

FOREIGN PATENT DOCUMENTS

WO   WO-2016118551 A1 * 7/2016 ............ B22F 1/0088

OTHER PUBLICATIONS

Kang et al. Materials Science and Engineering A 486 (2008) 300-307. (Year: 2008).*

(Continued)

*Primary Examiner* — Jennifer A Leung
(74) *Attorney, Agent, or Firm* — Miller Canfield

(57) ABSTRACT

A reactive hopper assembly for feeding a low pressure cold spray applicator for applying powder coatings is disclosed. A powder feed cartridge provides powder feed to a reaction chamber. An impeller housing is interconnected with the reaction chamber for receiving powder feed from the reaction chamber for metering powder feed received from the reaction chamber. A hopper vessel receives metered powder feed from the impeller housing for providing powder to the low pressure cold spray applicator. The reaction chamber is fluidly connected to a source of a reactive gas for chemically modifying the powder feed for in situ reducing surface oxidation of the powder feed.

12 Claims, 2 Drawing Sheets

(56) References Cited

U.S. PATENT DOCUMENTS 6,569,245 B2 * 5/2003 Krysa ................. B05B 7/1404
118/302
2015/0321253 A1 * 11/2015 Espinal ................ B22F 1/0062
419/35

OTHER PUBLICATIONS

Li et al. Applied Surface Science 256 (2010) 4953-4958. (Year: 2010).*
Irissou et al. Journal of Thermal Spray Technology, vol. 17(4), Dec. 2008, 495-516. (Year: 2008).*
Atsushi Kimura et al., "Reduction mechanism of surface oxide in aluminum alloy powders containing magnesium studied by x-ray photoelectron spectroscopy using synchrotron radiation", Appl. Phys. Lett., vol. 70, issue 26 (1997), pp. 3615-3619.
T.B. Sercombe and G.B. Schaffer, "On the role of tin in the nitridation of aluminum powder", Scripta Materialia, vol. 55 (2006), pp. 323-326.
Volf Leshchynsky et al., "Cold Gas Dynamic Spray," CRC Press (2016), 340p, (submitting relevant portion of the textbook contained in Chapter 3, titled "Cold Spray Powders and Equipment").

* cited by examiner

HOPPER WITH MICROREACTOR AND CARTRIDGE FOR LOW PRESSURE COLD SPRAYING

PRIOR APPLICATIONS

The present application claims priority to U.S. Provisional Patent Application No. 62/384,353 filed Sep. 7, 2016, the contents of which are included herein by reference.

TECHNICAL FIELD

The invention relates generally to a compact hopper combined with a microreactor for in-situ treatment of powder for use in a low pressure cold spraying process with an increased deposition rate.

BACKGROUND

The deposition of particles by means of low pressure cold spraying (LPCS) processes, for example on aluminum, steel and other alloy parts, has to date only been possible with the deposition of aluminum, copper and nickel particles having a size range of between about 45-50 μm and providing low adhesion strength and deposition efficiency of about 12-15%. The presence of an oxide layer on the particle surface makes it difficult to form a high adhesion coating of the particles utilizing the LPCS process, while diminishing of the oxide layer thickness allows to deposit coating with higher adhesion and considerably improved coating/substrate interface structure [R. Gr. Maev, V. Leshchynsky, Cold Gas Dynamic Spray, CRC Press, 2016, 340p].

In order to obtain high adhesion coatings with high deposition efficiency by LPCS, the oxide layer has to be maximally altered, diminished or removed from the particle surfaces. There are a few feasible methods for reduction of the oxide film, including a mechanical breakdown, reaction/plasma processing or heat treatment of the particles. For example, for Aluminum powders according to [A. Kimura et al., Reduction mechanism of surface oxide in aluminum alloy powders containing magnesium studied by x-ray photoelectron spectroscopy using synchrotron radiation, Appl. Phys. Lett. 70/26, (1997) 3615-3619], the removal of the oxide layer requires: (a) the presence of a small amount of Mg (over 0.01 mass %) in the reaction area and (b) an activation temperature above 773° K. Taking into account that most of Aluminum alloy powders (for example, the Al 6022 powders) contain 0.45-0.70 mass % of Mg, such powders are suitable for the oxide layer removal by thermal processing. However, a simple removal of the oxide layer from Aluminum-based alloy powders may not be enough, since a natural aluminum oxide coating will be formed again over the metallic Al 6022 powders exposed to the environment. To prevent re-oxidation, direct in situ nitriding of the Al alloy powders can be used to destroy Al oxide film and form a very thin AlN island on the particle surfaces [T. B. Sercombe and G. B. Schaffer, On the role of tin in the nitridation of aluminium powder, Scr. Mater. 55, (2006) 323-328].

Although schematics of hopper-microreactor, which consists of a powder cartridge holder and opening system, reaction vessel with mixing device and powder valve, powder feeder metering disc unit have been disclosed by U.S. Pat. No. 4,808,042, none have proven feasible for adaption to a LPCS application for the purpose of eliminating the oxide film problem. Therefore, it would be desirable to develop a feed assembly capable of solving the problems associated with prior art assemblies while still delivering powder feed in an economical manner.

SUMMARY

A reactive hopper assembly for feeding a low pressure cold spray applicator for applying powder coatings is disclosed. A powder feed cartridge provides powder feed to a reaction chamber. An impeller housing is interconnected with the reaction chamber for receiving powder feed from the reaction chamber for metering powder feed received from the reaction chamber. A hopper vessel receives metered powder feed from the impeller housing for providing powder to the low pressure cold spray applicator. The reaction chamber is fluidly connected to a source of a reactive gas for chemically modifying the powder feed for in situ reducing surface oxidation of the powder feed.

As set forth above, the compact hopper-microreactor or reactive hopper assembly for powder feeding of low pressure cold spraying processes includes a powder cartridge and a reaction chamber with mixing device and valve. A powder-metering disc device and powder flow stabilization vibration device achieve a stable powder feeding rate. In order to address the oxidation and re-oxidation layer from forming, it has been proposed to provide in situ treatment of the powder in the reaction chamber that allows modification of the particle surface structure by chemical reactions at various temperatures in nitrogen or equivalent gaseous flow before deposition. As set forth above, the reaction chamber is loaded with powder preliminarily mixed with reactive issues and placed into a cartridge in a nitrogen atmosphere.

In accordance with the invention, the processed powder particles are covered with modified oxide or nitride layers. The coverage results in reduction, and even elimination, of surface film damage during particle impingement and leads to creation of fresh surfaces and metallurgical bonding between particles.

BRIEF DESCRIPTION OF THE DRAWINGS

Other advantages of the present invention will be readily appreciated as the same becomes better understood by reference to the following detailed description when considered in connection with the accompanying drawings, wherein.

PROBLEM ADDRESSED

A first problem addressed is that of providing a hopper-microreactor assembly for processing a powder in situ before deposition.

A second problem addressed by the invention is that of providing a powder with a reduced surface oxide layer for a low pressure cold spraying process, which makes it possible to obtain coatings with high adhesion strength and deposition efficiency.

The design of the present invention allows for the compact hopper-microreactor to be integrated with cold spray gun.

DETAILED DESCRIPTION

Figure 1:
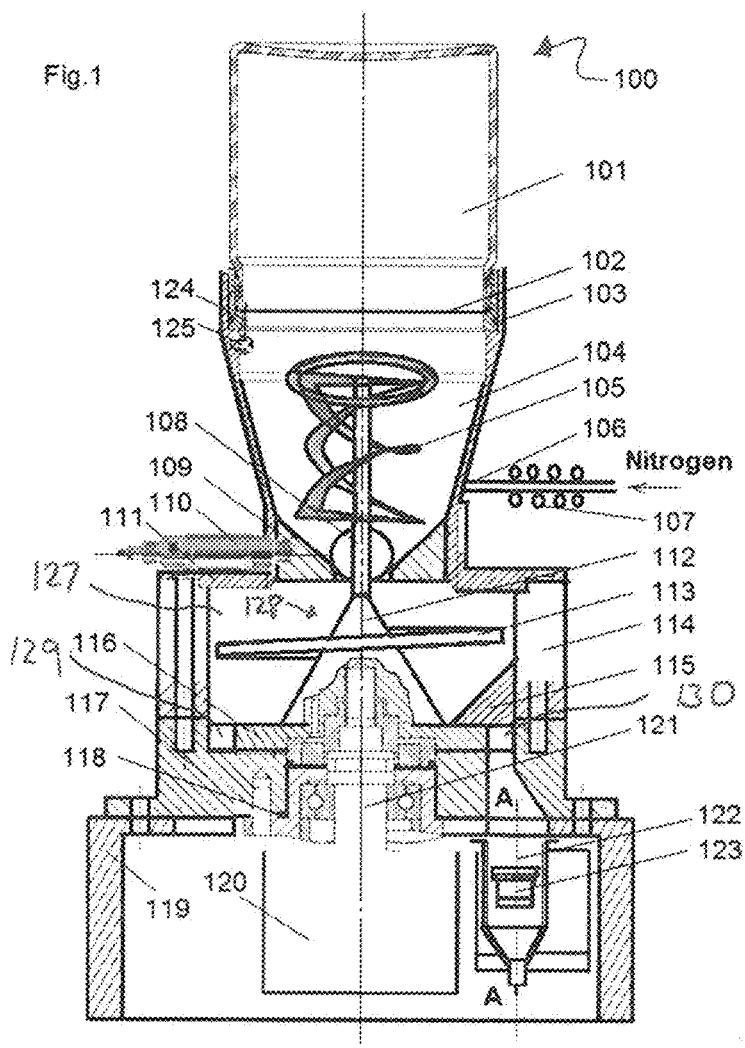
FIG. 1 shows a cross-sectional view of the assembly of the present invention.

FIG. 1 depicts a cross-sectional view of a powder feed assembly in accordance with the present invention generally at 100. The powder feed assembly 100 includes an upper hopper assembly 111 mounted on the top 114 of a powder metering device, which is joined with a main chassis 117 of the powder metering device installed on a basis housing 119. A powder flow stabilization device 122 with vibrating screen 123 is installed in the basic housing 119.

The upper hopper assembly 111 includes a hollow, generally cylindrical, vertically disposed powder cartridge 101 for containing a quantity of powder to be fed to micro-reactor 104. The cartridge 101 is mounted on the upper cartridge window 103 of the micro-reactor 104 by way of threaded engagement. A knife 124 mounted on the upper cartridge window 103 with screw 125 cuts the paper cover 102 during a cartridge 101 turn. The micro-reactor 104 assembly includes agitator 105 located inside micro-reactor 104 for mixing, agitating and thermal processing powder within micro-reactor 104 in the heated nitrogen atmosphere provided by nitrogen source 106, and heating coil 107. The processed powder selectively exits the micro-reactor 104 via the valve 108 through a powder hose 126 through a frame 109 with vibrator 110 that opens and closes the valve 108.

The processed powder is directed into the impeller chamber 127 to a stir spindle assembly 128, which includes a spindle 112 and stirring element 113. The stirring element 113 is mounted at the spindle 112 upper end. A pivot of the stirring element 113 serves to agitate and break up the powder upon receipt into the impeller chamber 127.

A powder feed impeller 116 includes an outer periphery including a plurality of teeth 129 defining a plurality of notches 130. The lower end of a powder metering device housing 114 has an inside insert 115, which contacts the top surface of the impeller 116. As the powder feed impeller 116 rotates by virtue of rotation of the primary drive shaft 121, each of the impeller teeth moves under the inside insert 115 and into the region of cavity located in the main chassis 117. A cavity 125 in the main chassis 117 extends from the upper surface of the main chassis 117 through the bottom of the chassis 117 and into the basic housing 119.

As shown in FIG. 1, a cavity 125 in the chassis 117 tapers in its cross-sectional area with the impeller notch 130 for receiving powder material. Therefore, the powder as so agitated and de-agglomerated falls onto the powder feed impeller 116 where it falls into the notches 130 between the teeth 129. An insert 115 controls the amount of powder capable of passing through a notch 130 into the cavity 125 by scraping excess powder from the powder feed impeller 116. As the powder feed impeller 116 rotates, its teeth 129 and notches 130 beneath the inside insert 115 scrapes excess powder from the notches 130. Therefore, a controlled amount of the powder is allowed to remain within each notch 130 to a height approximately equal to the thickness of the powder feed impeller 116. This controlled amount of powder falls through the cavity 125 defined by the chassis 117. Therefore, the action of the powder feed impeller 116 dispenses controlled amount of powder through the cavity 125 in the chassis 117 with the rate of supply of such a controlled amount being determined by the speed of rotation of primary drive shaft 121 and electric motor 120 that rotates the powder feed impeller 116.

Feeding controlled amounts of powder with powder metering device through the chassis may result in the powder aggregating due to its small particle size (between about 15-50 μm). Aggregation may inhibit the uniform powder flow through the powder supply passage 212 (FIG. 2) toward the low pressure cold spray gun (not shown). As shown in FIG. 1, a powder flow stabilization vibration device 122 is installed in the basic housing 119 and includes wire mesh 123.

Figure 2:
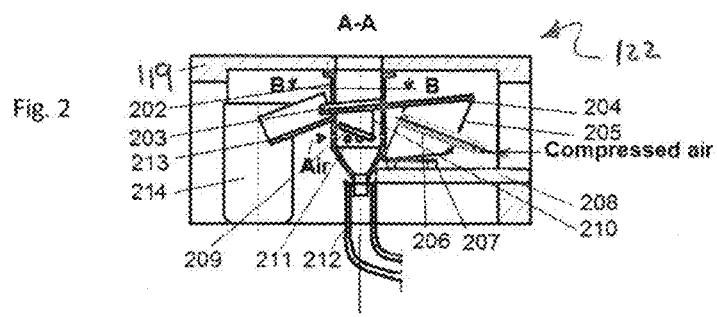
FIG. 2 shows a cross-sectional view of a powder flow stabilization vibration device through section A-A of FIG. 1.
Figure 3:
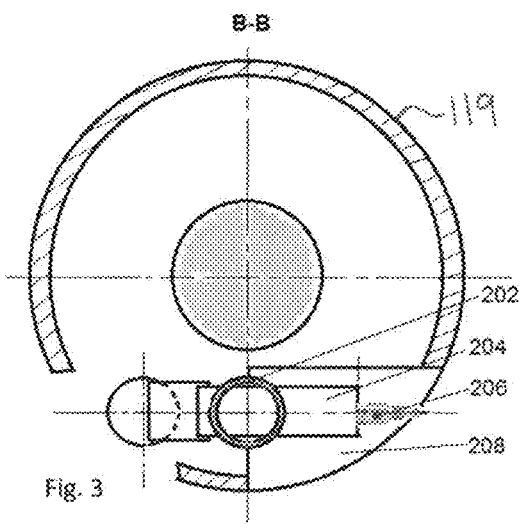
FIG. 3 shows a cross-sectional of the powder flow stabilization vibration device through section BB of FIG. 2.

The more detailed view of the powder flow stabilization vibration device 122 is shown on FIG. 2, which depicts the cross-section A-A of FIG. 1 and in FIG. 3, which depicts the cross-section B-B of FIG. 2. The vibration device 122 includes a hopper vessel 202 that is mounted within the basic housing 201. A main mesh screen 203 is mounted on a vibration plate 204, which passes through the hopper vessel 202 and receives vibrational movement from vibrating unit 205. The vibrating unit 205 is driven by a pneumatic vibrator 206 installed on a table 208 that is joined with the basic housing 201.

A second mesh screen 209 is connected to an opposing side of the hopper 202 vessel as is the main mesh screen 203. Therefore, the main mesh screen 203 and the second mesh screen 209 vibrate at the same frequency. The hopper vessel 202 defines holes 211 through which air is drawn due to negative pressure in the powder passage 212 when the low pressure cold spraying gun is activated. The holes 211 prevent negative pressure from being translated into the reaction chamber 104 via the impeller chamber 127. After passing through the screens 203, 209, the powder is drawn by air flow toward the spraying gun with through powder passage 212 in a known manner.

A controlled amount of powder falls on the main mesh screen 203 and powder agglomerates are being broken due to the screen vibration. Some of the small agglomerates that pass through the main screen 203 are subsequently de-agglomerated by the second screen 209. A powder race 213 and bowl 214 are installed for evacuation of the particle aggregates, which do not pass through the main screen 203. The particle aggregates which do not pass through the main screen 203 are fed through the powder race 213 towards the bowl 214.

Figure 4:
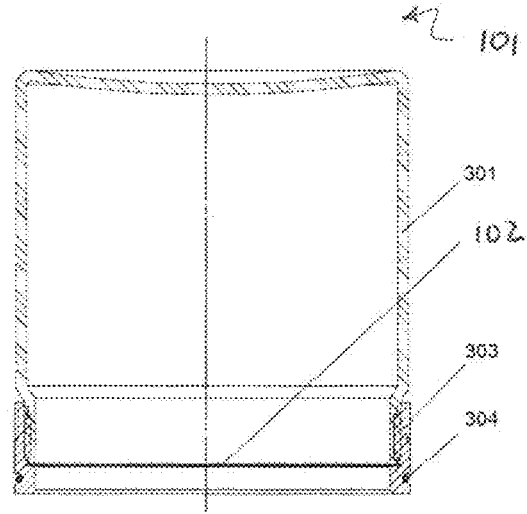
FIG. 4 shows a cross-sectional view of a cartridge of the present invention.

FIG. 4 depicts a cross-sectional view of the powder cartridge 300. The powder cartridge 300 includes the cartridge canister 301 in which a quantity of powder material is hermetically sealed by paper or equivalent cover 301. As set forth above, the cartridge 300 is sealed in a nitrogen or equivalent gaseous environment for reducing oxidation on the surface of the particles disposed within the cartridge 300. A cartridge cup 303 receives an end of the cartridge canister 301 that is hermetically sealed by way of threaded or equivalent engagement. An o-ring seal 304 circumscribes the cartridge cup 303 for sealing cartridge cup 303, and, therefore, the cartridge canister 301 when threadably engaged to the cartridge-hopper window interface.

As set forth above, the cartridge cup 303 is mounted on the upper cartridge window 103 by way of threaded engagement. During mounting, the knife 124 cuts the paper cover 301 breaking the hermetic seal and allowing powder to be released into the micro-reactor chamber 104 for mixing, agitating and thermal processing. Upon release, heated nitrogen, or an equivalent gas is introduced to the chamber 104 through the nitrogen source 106. Because the chamber 104 is sealed, little opportunity is presented for oxidation of the powder material.

The invention has been described in an illustrative manner, and it is to be understood that the terminology that has been used is intended to be in the nature of words of description rather than of limitation. Obviously, many modifications and variations of the present invention are possible in light of the above teachings. It is therefore to be understood that within the specification, the reference numerals are merely for convenience, and are not to be in any way limiting, and that the invention may be practiced otherwise than is specifically described. Therefore, the invention can be practiced otherwise than is specifically described within the scope of the intended claims.

What is claimed is:

1. A reactive hopper assembly for feeding a low pressure cold spray applicator for applying powder coatings, comprising:
a powder feed cartridge for providing powder feed;
a reaction chamber for receiving powder feed from said powder feed cartridge;
an impeller housing being interconnected with said reaction chamber for receiving powder feed from said reaction chamber for metering powder feed received from said reaction chamber;
a hopper vessel receiving metered powder feed from said impeller housing for providing powder to said low pressure cold spray applicator; and
said reaction chamber being fluidly connected to a source of a reactive gas for chemically modifying the powder feed thereby in situ reducing surface oxidation of the powder feed.

2. The assembly set forth in claim 1, wherein said reaction chamber includes a nitrogen rich environment via said source of reactive gas.

3. The assembly set forth in claim 1, wherein said source of reactive gas includes a heating coil for heating the reactive gas.

4. The assembly set forth in claim 1, wherein said powder cartridge includes a cover for sealing said powder cartridge and said reaction chamber includes a knife for piercing said cover while mating said powder cartridge to said reaction chamber thereby releasing the powder feed into said reaction chamber.

5. The assembly set forth in claim 1, wherein said reaction chamber includes an agitator for mixing the powder received from the powder cartridge with the reactive gas received from the source of reactive gas.

6. The assembly set forth in claim 1, wherein said impeller housing includes a stirring element for stirring powder feed received from said reaction chamber.

7. The assembly set forth in claim 1, wherein said impeller housing includes a powder feed impeller for metering powder feed delivered to said hopper vessel from said impeller housing.

8. The assembly set forth in claim 7, wherein said impeller includes radially outwardly teeth defining notches there between for collecting powder feed being delivered to said hopper vessel.

9. The assembly set forth in claim 1, wherein said reaction chamber includes a reaction valve for selectively releasing powder feed from said reaction chamber to said impeller housing.

10. The assembly set forth in claim 1, wherein reaction chamber is fluidized by the reactive gas and the reactive gas comprises nitrogen.

11. The assembly set forth in claim 1, wherein said stirring element disposed in said impeller chamber includes a distribution cone being coaxial with said stirring element for distributing powder feed disposed within said impeller chamber.

12. The assembly set forth in claim 1, wherein said powder disposed in said powder cartridge is sealably enclosed with at least one of nitrogen, argon or an equivalent gas.

\* \* \* \* \*